(12) United States Patent
Dawson et al.

(10) Patent No.: US 9,009,294 B2
(45) Date of Patent: Apr. 14, 2015

(54) DYNAMIC PROVISIONING OF RESOURCES WITHIN A CLOUD COMPUTING ENVIRONMENT

(75) Inventors: Christopher J. Dawson, Arlington, VA (US); Vincenzo V. Diluoffo, Sandy Hook, CT (US); Michael D. Kendzierski, New York, NY (US); James W. Seaman, Falls Church, VA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/636,666

(22) Filed: Dec. 11, 2009

(65) Prior Publication Data
US 2011/0145392 A1    Jun. 16, 2011

(51) Int. Cl.
G06F 15/16 (2006.01)
G06F 15/173 (2006.01)
G06F 9/50 (2006.01)
H04L 12/24 (2006.01)
H04L 12/911 (2013.01)

(52) U.S. Cl.
CPC .......... *G06F 9/5072* (2013.01); *H04L 41/0816* (2013.01); *H04L 41/0896* (2013.01); *H04L 47/783* (2013.01); *H04L 41/0813* (2013.01); *H04L 47/823* (2013.01)

(58) Field of Classification Search
CPC ............ H04L 41/0813; H04L 41/0816; H04L 41/0896; H04L 47/783; H04L 47/823; H04L 67/1031; H04L 67/1008
See application file for complete search history.

(56) References Cited

U.S. PATENT DOCUMENTS

| 7,114,146 | B2 | 9/2006 | Zhang et al. |
| 7,305,431 | B2 | 12/2007 | Karnik et al. |
| 7,464,160 | B2 | 12/2008 | Iszlai et al. |
| 7,596,620 | B1 * | 9/2009 | Colton et al. ................. 709/226 |
| 7,870,044 | B2 * | 1/2011 | Robertson ........................ 705/34 |
| 8,499,066 | B1 * | 7/2013 | Zhang et al. .................. 709/223 |
| 8,555,287 | B2 * | 10/2013 | Ding et al. .................... 718/104 |
| 2002/0099669 | A1 | 7/2002 | Lauer |
| 2003/0105810 | A1 * | 6/2003 | McCrory et al. .............. 709/203 |
| 2003/0120771 | A1 | 6/2003 | Laye et al. |
| 2003/0154123 | A1 | 8/2003 | Subbloie et al. |

(Continued)

OTHER PUBLICATIONS

Mell, et al. "The NIST Definition of Cloud Computing", National Institute of Standards and Technology, Information Technology Laboratory, Version 15, Oct. 7, 2009, 2 pages.

(Continued)

*Primary Examiner* — Aaron Strange
(74) *Attorney, Agent, or Firm* — William E. Schiesser; Keohane & D'Alessandro PLLC; Maxine L. Barasch

(57) ABSTRACT

The present invention provides a solution (e.g., rules, techniques, etc.) for enabling the dynamic provisioning (e.g., movement) of Cloud-based jobs and resources. Such provisioning may be within a Cloud infrastructure, from Cloud to Cloud, from non-Cloud to Cloud, and from Cloud to non-Cloud. Each movement scenario is assigned a specific technique based on rules, profiles, SLA and/or other such criteria and agreements. Such dynamic adjustments may be especially advantageous in order to balance real-time workload to avoid over-provisioning, to manage Cloud performance, to attain a more efficient or cost-effective execution environment, to off-load a Cloud or specific Cloud resources for maintenance/service, and the like.

14 Claims, 6 Drawing Sheets

(56) References Cited

U.S. PATENT DOCUMENTS

| | | |
|---|---|---|
| 2004/0220910 A1 | 11/2004 | Zang et al. |
| 2005/0172027 A1 | 8/2005 | Castellanos et al. |
| 2005/0188075 A1 | 8/2005 | Dias et al. |
| 2006/0212545 A1 | 9/2006 | Nichols et al. |
| 2006/0253587 A1 | 11/2006 | Tullis et al. |
| 2008/0010293 A1 | 1/2008 | Zpevak et al. |
| 2008/0046266 A1 | 2/2008 | Gudipalley et al. |
| 2008/0080396 A1 | 4/2008 | Meijer et al. |
| 2008/0082490 A1 | 4/2008 | MacLaurin et al. |
| 2008/0155100 A1 | 6/2008 | Ahmed et al. |
| 2008/0235149 A1 | 9/2008 | Dan et al. |
| 2009/0089078 A1 | 4/2009 | Bursey |
| 2009/0112759 A1 | 4/2009 | Foster |
| 2009/0276771 A1 | 11/2009 | Nickolov et al. |
| 2009/0300635 A1 | 12/2009 | Ferris |
| 2010/0042449 A1 | 2/2010 | Thomas |
| 2010/0042720 A1* | 2/2010 | Stienhans et al. ............. 709/226 |
| 2010/0061250 A1 | 3/2010 | Nugent |
| 2010/0131324 A1 | 5/2010 | Ferris |
| 2011/0137805 A1 | 6/2011 | Brookbanks et al. |
| 2011/0276713 A1 | 11/2011 | Brand |

OTHER PUBLICATIONS

Maitland, J., "Keeping Control Isn't Easy", Chapter 4: Cloud-Based Infrastructure, SearchCloudComputing.com, 13 pages.

U.S. Appl. No. 12/636,662, Office Action, Nov. 9, 2010, 18 pages.
U.S. Appl. No. 12/636,662, Office Action, Mar. 29, 2011, 19 pages.
U.S. Appl. No. 12/636,662, Office Action, Oct. 3, 2012, 15 pages.
U.S. Appl. No. 12/636,662, Office Action, Feb. 19, 2013, 24 pages.
U.S. Appl. No. 12/636,662, Office Action, Mar. 14, 2014, 36 pages.
U.S. Appl. No. 12/636,662, Notice of Allowance, Aug. 6, 2014, 24 pages.
Li et al., "Towards job-specific service level agreements in the cloud", E-Science Workshops, 2009, 4 pages.
Nowak et al., Bandwidth Allocation for Service Level Agreement Aware Ethernet Passive Optical Networks, IEEE Communications Society, Globecom 2004, 5 pages.
Paletta et al., "A MAS-based Negotiation Mechanism to deal with Service Collaboration in Cloud Computing", 2009 International Conference on Intelligent Networking and Collaborative Systems, 7 pages.
Sato, "Creating Next Generation Cloud Computing based Network Services and the Contributions of Social Cloud Operation Support Systems (OSS) to Society", 2009 18th IEEE International Workshops on Enabling Technologies: Infrastructures for Collaborative Enterprises, 5 pages.

* cited by examiner

DYNAMIC PROVISIONING OF RESOURCES WITHIN A CLOUD COMPUTING ENVIRONMENT

CROSS-REFERENCE TO RELATED APPLICATION

This application is related in some aspects to U.S. application Ser. No. 12/636,662, having Publication No. 2011-0145153 A1, filed on Dec. 11, 2009, and entitled "Negotiating Agreements within a Cloud Computing Environment," the entire contents of which are herein incorporated by reference.

FIELD OF THE INVENTION

The present invention generally relates to Cloud computing. Specifically, the present invention relates to the dynamic provisioning of resources within a Cloud computing environment.

BACKGROUND OF THE INVENTION

The Cloud computing environment is an enhancement to the predecessor grid environment, whereby multiple grids and other computation resources may be further abstracted by the Cloud layer, thus making disparate devices appear to an end-user as a single pool of seamless resources. These resources may include such things as physical or logical compute engines, servers and devices, device memory, storage devices, networks, business applications and other software, and the like. It may be necessary for a Cloud to increase or decrease such resources either temporarily, or permanently, and/or to move active jobs between resources for efficiency, load balancing, and/or other purposes. Unfortunately, no existing solution addresses this need.

SUMMARY OF THE INVENTION

The present invention provides a solution (e.g., rules, techniques, etc.) for enabling the dynamic provisioning (e.g., movement) of Cloud-based jobs and resources. Such provisioning may be within a Cloud infrastructure, from Cloud to Cloud, from non-Cloud to Cloud, and from Cloud to non-Cloud. Each movement scenario is assigned a specific technique based on rules, profiles, Service level Agreements (SLAs) and/or other such criteria and agreements. Such dynamic adjustments may be especially advantageous in order to balance real-time workload to avoid over-provisioning, to manage Cloud performance, to attain a more efficient or cost-effective execution environment, to off-load a Cloud or specific Cloud resources for maintenance/service, and the like.

A first aspect of the present invention provides a method for dynamically provisioning resources within a Cloud computing environment, comprising: identifying a need for Cloud resources for a first Cloud provider; evaluating a current state of the first Cloud provider to determine if a state change is required to address the need; determining whether sufficient resources exist to address the need; determining a set of actions to address the need; and dynamically provisioning a set of Cloud resources to perform the set of actions.

A second aspect of the present invention provides a system for dynamically provisioning resources within a Cloud computing environment, comprising: a memory medium comprising instructions; a bus coupled to the memory medium; a processor coupled to the bus that when executing the instructions causes the system to: identify a need for Cloud resources for a first Cloud provider; evaluate a current state of the first Cloud provider to determine if a state change is required to address the need; determine whether sufficient resources exist to address the need; determine a set of actions to address the need; and dynamically provision a set of Cloud resources to perform the set of actions.

A third aspect of the present invention provides a computer readable medium containing a program product for dynamically provisioning resources within a Cloud computing environment, the computer readable medium comprising program code for causing a computer to: identify a need for Cloud resources for a first Cloud provider; evaluate a current state of the first Cloud provider to determine if a state change is required to address the need; determine whether sufficient resources exist to address the need; determine a set of actions to address the need; and dynamically provision a set of Cloud resources to perform the set of actions.

A fourth aspect of the present invention provides a method for deploying a system for dynamically provisioning resources within a Cloud computing environment: comprising: providing a computer infrastructure being operable to: identify a need for Cloud resources for a first Cloud provider; evaluate a current state of the first Cloud provider to determine if a state change is required to address the need; determine whether sufficient resources exist to address the need; determine a set of actions to address the need; and dynamically provision a set of Cloud resources to perform the set of actions.

BRIEF DESCRIPTION OF THE DRAWINGS

These and other features of this invention will be more readily understood from the following detailed description of the various aspects of the invention taken in conjunction with the accompanying drawings in which.

Figure 1:
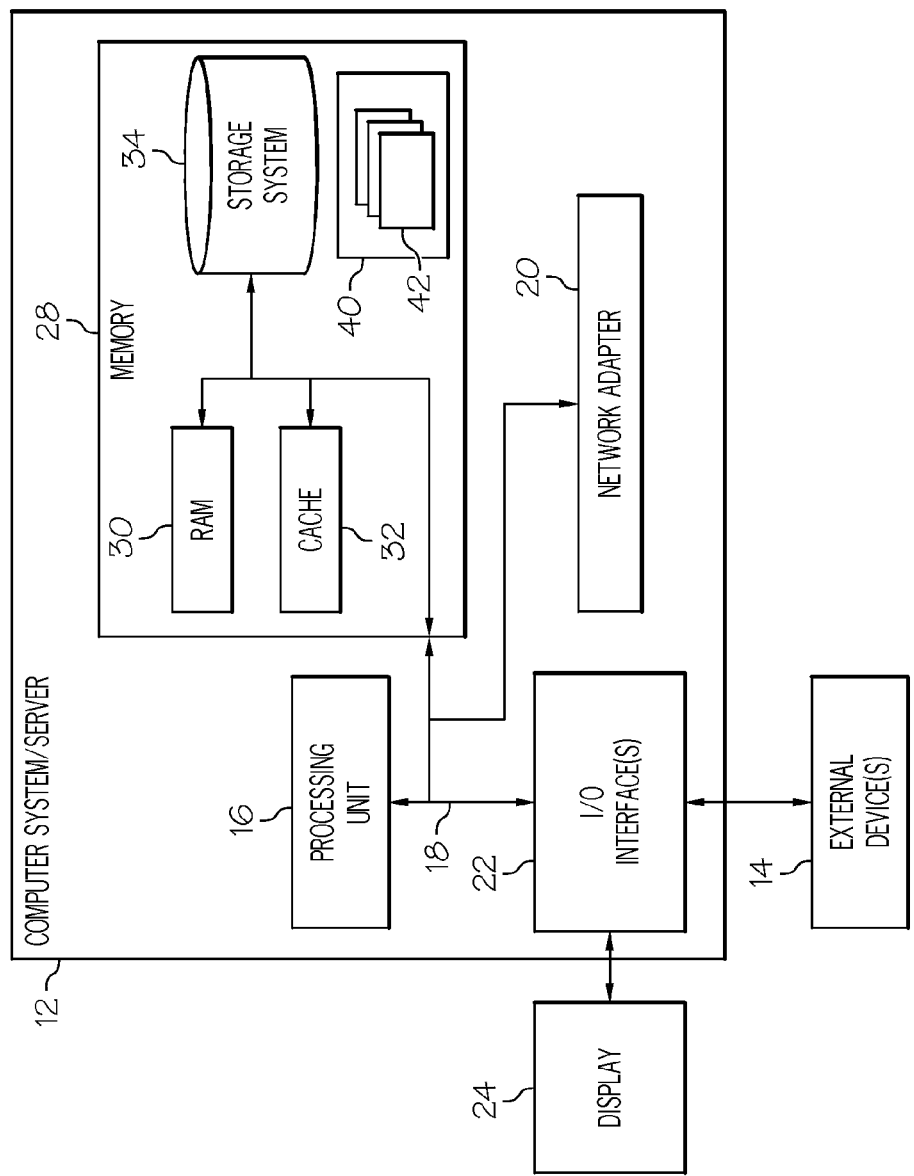
FIG. 1 shows a Cloud system node according to the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

For convenience, the Detailed Description of the Invention has the following sections:

I. Cloud Computing Definitions

II. Detailed Implementation of the Invention

I. Cloud Computing Definitions

The following definitions have been derived from the "Draft NIST Working Definition of Cloud Computing" by Peter Mell and Tim Grance, dated Oct. 7, 2009, which is cited on an IDS filed herewith, and a copy of which is attached thereto.

Cloud computing is a model for enabling convenient, on-demand network access to a shared pool of configurable computing resources (e.g., networks, servers, storage, applications, and services) that can be rapidly provisioned and released with minimal management effort or service provider interaction. This Cloud model promotes availability and is comprised of at least five characteristics, at least three service models, and at least four deployment models.

Characteristics are as follows:

On-demand self-service: A consumer can unilaterally provision computing capabilities, such as server time and network storage, as needed automatically without requiring human interaction with each service's provider.

Broad network access: Capabilities are available over a network and accessed through standard mechanisms that promote use by heterogeneous thin or thick client platforms (e.g., mobile phones, laptops, and PDAs).

Resource pooling: The provider's computing resources are pooled to serve multiple consumers using a multi-tenant model, with different physical and virtual resources dynamically assigned and reassigned according to consumer demand. There is a sense of location independence in that the customer generally has no control or knowledge over the exact location of the provided resources but may be able to specify location at a higher level of abstraction (e.g., country, state, or datacenter). Examples of resources include storage, processing, memory, network bandwidth, and virtual machines.

Rapid elasticity: Capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: Cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Cloud Software as a Service (SaaS): The capability provided to the consumer is to use the provider's applications running on a Cloud infrastructure. The applications are accessible from various client devices through a thin client interface such as a web browser (e.g., web-based email). The consumer does not manage or control the underlying Cloud infrastructure including network, servers, operating systems, storage, or even individual application capabilities, with the possible exception of limited user-specific application configuration settings.

Cloud Platform as a Service (PaaS): The capability provided to the consumer is to deploy onto the Cloud infrastructure consumer-created or acquired applications created using programming languages and tools supported by the provider. The consumer does not manage or control the underlying Cloud infrastructure including networks, servers, operating systems, or storage, but has control over the deployed applications and possibly applications hosting environment configurations.

Cloud Infrastructure as a Service (IaaS): The capability provided to the consumer is to provision processing, storage, networks, and other fundamental computing resources where the consumer is able to deploy and run arbitrary software, which can include operating systems and applications. The consumer does not manage or control the underlying Cloud infrastructure but has control over operating systems, storage, deployed applications, and possibly limited control of select networking components (e.g., host firewalls).

Deployment Models (Also known as "Cloud implementations" or "Cloud types") are as follows:

Private Cloud: The Cloud infrastructure is operated solely for an organization. It may be managed by the organization or a third party and may exist on-premises or off-premises.

Community Cloud: The Cloud infrastructure is shared by several organizations and supports a specific community that has shared concerns (e.g., mission, security requirements, policy, and compliance considerations). It may be managed by the organizations or a third party and may exist on-premises or off-premises.

Public Cloud: The Cloud infrastructure is made available to the general public or a large industry group and is owned by an organization selling Cloud services.

Hybrid Cloud: The Cloud infrastructure is a composition of two or more Clouds (private, community, or public) that remain unique entities but are bound together by standardized or proprietary technology that enables data and application portability (e.g., Cloud bursting for load-balancing between Clouds).

A Cloud computing environment is service oriented with a focus on statelessness, low coupling, modularity, and semantic interoperability.

II. Detailed Implementation of the Invention

As indicated above, the present invention provides a solution (e.g., rules, techniques, etc.) for enabling the dynamic provisioning (e.g., movement) of Cloud-based jobs and resources. Such provisioning may be within a Cloud infrastructure, from Cloud to Cloud, from non-Cloud to Cloud, and from Cloud to non-Cloud. Each movement scenario is assigned a specific technique based on rules, profiles, SLA and/or other such criteria and agreements. Such dynamic adjustments may be especially advantageous in order to balance real-time workload to avoid over-provisioning, to manage Cloud performance, to attain a more efficient or cost-effective execution environment, to off-load a Cloud or specific Cloud resources for maintenance/service, and the like. As used herein, the term "job" is defined as a set (e.g., at least one) of tasks or actions.

Referring now to FIG. 1, a schematic of an exemplary Cloud computing node is shown. Cloud computing node 10 is only one example of a suitable Cloud computing node and is not intended to suggest any limitation as to the scope of use or functionality of the invention described herein. Regardless, Cloud computing node 10 is capable of being implemented and/or performing any of the functions set forth in Section I above.

In Cloud computing node 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed Cloud computing environments that include any of the above systems or devices, and the like.

Computer system/server 12 may be described in the general context of computer system-executable instructions, such as program modules, being executed by a computer system. Generally, program modules include routines, programs, objects, components, logic, data structures, and so on, that perform particular tasks or implement particular abstract data types. The exemplary computer system/server 12 may be practiced in distributed Cloud computing environments where tasks are performed by remote processing devices that are linked through a communications network. In a distributed Cloud computing environment, program modules may be located in both local and remote computer system storage media including memory storage devices.

As shown in FIG. 1, computer system/server 12 in Cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, a storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of the invention.

Program/utility 40 having a set (at least one) of program modules 42 may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
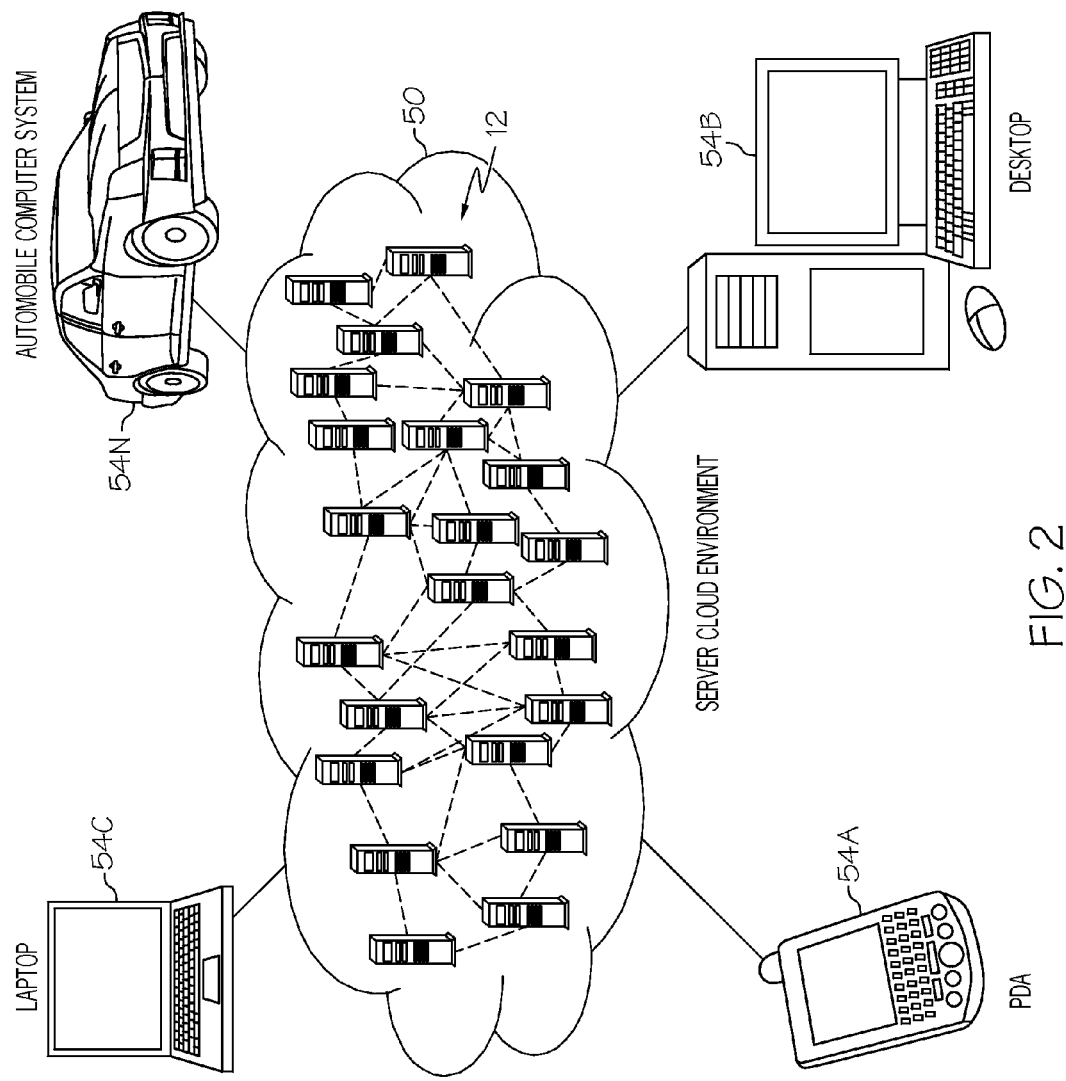
FIG. 2 shows a Cloud computing environment according to the present invention.

Referring now to FIG. 2, illustrative Cloud computing environment 50 is depicted. As shown, Cloud computing environment 50 comprises one or more Cloud computing nodes 10 with which computing devices such as, for example, personal digital assistant (PDA) or cellular telephone 54A, desktop computer 54B, laptop computer 54C, and/or automobile computer system 54N communicate. This allows for infrastructure, platforms, and/or software to be offered as services (as described above in Section I) from Cloud computing environment 50, so as to not require each client to separately maintain such resources. It is understood that the types of computing devices 54A-N shown in FIG. 2 are intended to be illustrative only and that Cloud computing environment 50 can communicate with any type of computerized device over any type of network and/or network/addressable connection (e.g., using a web browser).

Figure 3:
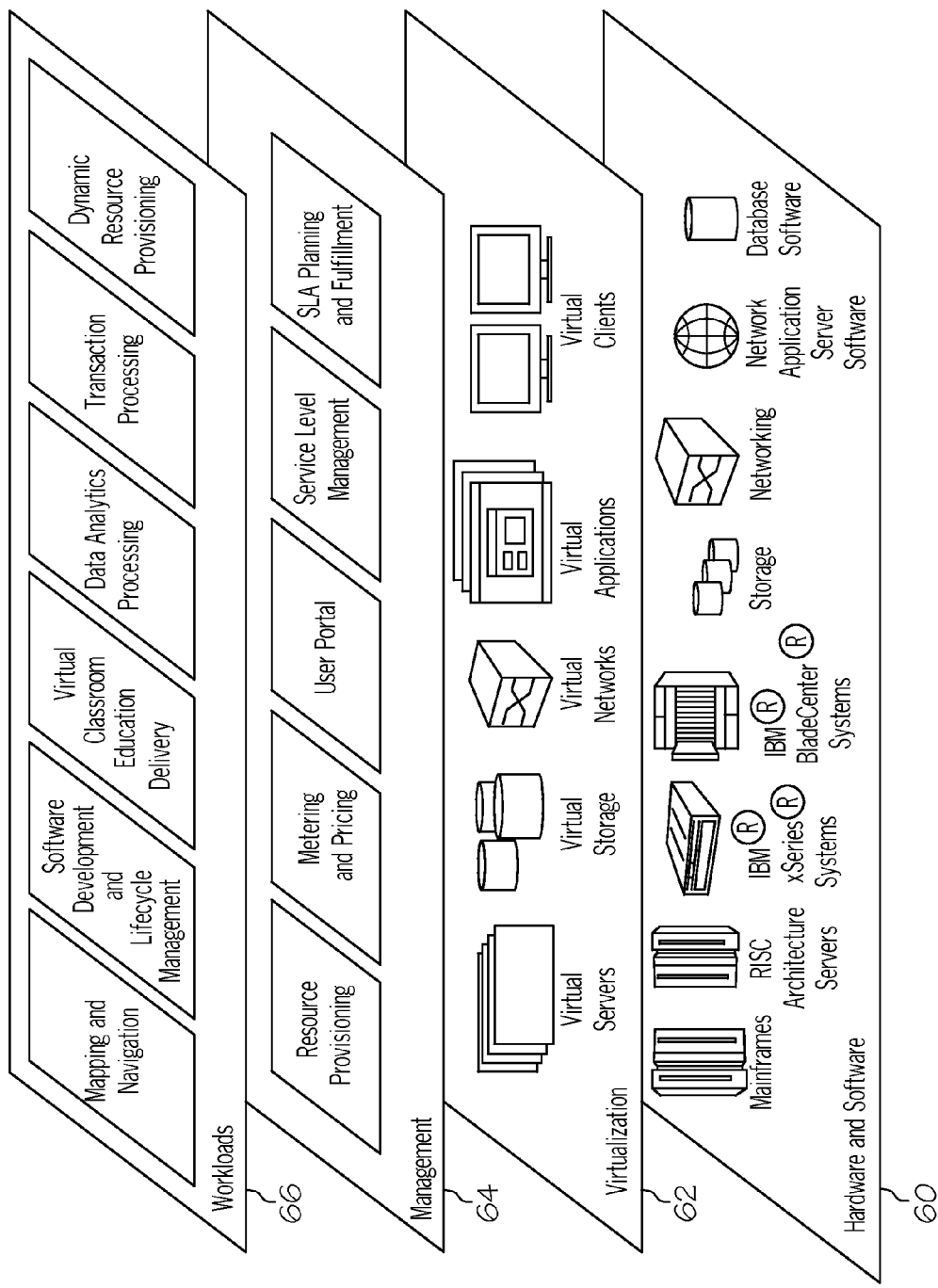
FIG. 3 shows Cloud abstraction model layers according to the present invention.

Referring now to FIG. 3, a set of functional abstraction layers provided by Cloud computing environment 50 (FIG. 2) is shown. It should be understood in advance that the components, layers, and functions shown in FIG. 3 are intended to be illustrative only, and the invention is not limited thereto. As depicted, the following layers and corresponding functions are provided:

Hardware and software layer 60 includes hardware and software components. Examples of hardware components include mainframes. In one example, IBM® zSeries® systems and RISC (Reduced Instruction Set Computer) architecture based servers. In one example, IBM pSeries® systems, IBM xSeries® systems, IBM BladeCenter® systems, storage devices, networks, and networking components. Examples of software components include network application server software. In one example, IBM WebSphere® application server software and database software. In one example, IBM DB2® database software. (IBM, zSeries, pSeries, xSeries, BladeCenter, WebSphere, and DB2 are trademarks of International Business Machines Corporation in the United States, other countries, or both.)

Virtualization layer 62 provides an abstraction layer from which the following exemplary virtual entities may be provided: virtual servers; virtual storage; virtual networks, including virtual private networks; virtual applications; and virtual clients.

Management layer 64 provides the exemplary functions described below. Resource provisioning provides dynamic procurement of computing resources and other resources that are utilized to perform tasks within the Cloud computing environment. Metering and pricing provide cost tracking as resources are utilized within the Cloud computing environment, and billing or invoicing for consumption of these resources. In one example, these resources may comprise application software licenses. Security provides identity verification for users and tasks, as well as protection for data and other resources. User portal provides access to the Cloud computing environment for both users and system administrators. Service level management provides Cloud computing resource allocation and management such that required service levels are met. Service Level Agreement (SLA) planning and fulfillment provides pre-arrangement for, and procurement of, Cloud computing resources for which a future requirement is anticipated in accordance with an SLA.

Workloads layer 66 provides functionality for which the Cloud computing environment is utilized. Examples of workloads and functions which may be provided from this layer include: mapping and navigation; software development and lifecycle management; virtual classroom education delivery; data analytics processing; transaction processing; and dynamic resource provisioning functionality, which can work in conjunction with resource provisioning functionality of management layer 64. As mentioned above, all of the foregoing examples described with respect to FIG. 3 are illustrative only, and the invention is not limited to these examples.

Dynamic resource provisioning functionality generally implements the teachings of the present invention. To this extent, dynamic provisioning functionality can be implemented as hardware, software (e.g., program modules 42 of utility/program 40), or a combination thereof. Regardless, the dynamic resource provisioning functions of the present invention will be further described in conjunction with FIGS. 4-6, as well as the illustrative examples set forth below.

The Cloud computing environment such as that described herein is an enhancement to the grid environment, whereby multiple grids may be further abstracted by the Cloud layer, thus making disparate coupled devices appear to end-users as a single pool of resources. These resources may include such things as compute engines, storage, networks, and the like. It may be necessary for a Cloud to increase such resources either temporarily, or permanently. With the vast number of potentially under-utilized computing resources in homes, offices, and data centers throughout the world, an automated and cooperative mechanism for dynamic resources based on real-time, scheduled, and/or projected on-going requirements for Cloud resources is desirable. A borrowing entity obtains value in an increase of infrastructure resources as needed without the requirement of purchasing additional equipment. A lending entity may derive value in a number of ways, including monetary, social (a university "lends" resources to another Cloud provider to solve a tough problem), relational (since I can borrow from you when I need to, you can borrow from me when you need to), and the like. Based on such agreements, automated mechanisms can be established whereby one or more "partner" entities may be queried, and, when appropriate, resources moved between the two. As an example, if the first Cloud provider "A" anticipates computational requirements at a specific point in time beyond the capacity of its dedicated Cloud resources, it could perhaps temporarily move jobs to, or borrow resources from, its partner Cloud provider "B". Some circumstances may also exist where it would be desirable to make a permanent acquisition of such resources where, for example, Cloud provider "B" becomes less focused on Cloud computing and thus needs less resources, and Cloud provider "A" picks up the slack and needs more resources.

Consider an illustrative example based on the end-user agreement on job SLA where a job may run on any Cloud infrastructure that meets at least the minimum SLA requirements for the job. In this example, a tier-3 job may be dispatched and moved, one or more times, to any Cloud or non-Cloud infrastructure that provides a tier-1, 2, or 3 environment, all at the discretion of the service provider, and may be executed in either an automated or manual fashion. This example job would not, however, move to a tier-4 or lower environment for execution. In a preferred embodiment, the primary Cloud would be responsible for tracking and managing the job to completion and billing the end-client, regardless of where the job actually executes. An algorithm is established in order to determine, on a case by case basis, whether the appropriate resource provisioning/management method includes movement of jobs, movement of physical resources, movement of logical resources, temporary or permanent acquisition of additional resources, or some other combination of methods.

Figure 4:
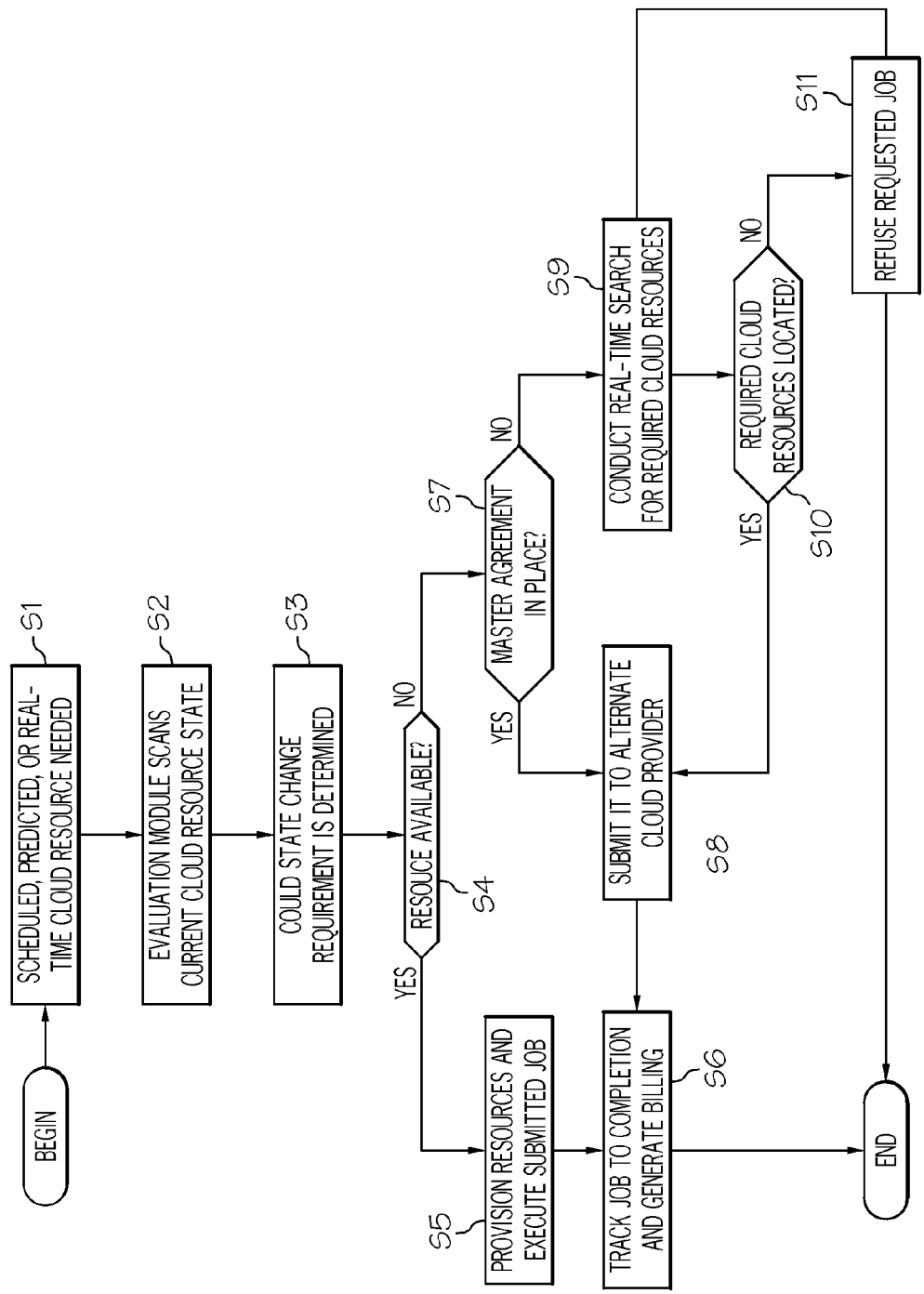
FIG. 4 shows a first method diagram according the present invention.

FIG. 4 provides an illustrative logic flow of one embodiment of the present invention. In step S1, a determination is made that Cloud resources are needed e.g., (a need for resources is identified for a first Cloud provider). This determination may be the result of, but not limited to: a new job request; a new job submission (scheduled or real-time); a new phase of an existing executing job (e.g., a data load operation; a hard or soft limit for a resource or resource pool; a predictive analysis; and/or a request from another Cloud provider. In step S2, an evaluation module receives the requirements data from step S1, and analyzes the current state of the Cloud against the requirements. In step S3, a determination is made whether or not a state change is required/desired within the Cloud. Possible desirable state changes may be, but are not limited to, the following: provision existing physical or logical hardware (as an example, turn on a new CoD CPU); integrate new hardware into the Cloud (permanently or temporarily); provision software (modify existing or install new, this may include installing the Cloud software and middleware itself); suspend low priority jobs currently executing on the Cloud; dynamically move jobs currently executing on the Cloud (within the current Cloud, to an alternate Cloud or an alternate non-Cloud environment); and/or temporarily borrow resources from another Cloud.

In step S4, a determination is passed down from Steps S2 and S3, and a branch occurs based on Cloud state and resource availability (e.g., are there sufficient resources in existence to address the need). In step S5, a determination has been made that resources are currently available, and any state change (as described in step S3) is accomplished, and when due to a new job, the job is executed. In step S6, the job executes on the grid per normal business practice and is tracked to completion. Upon completion, the job ends, accounting data is generated, and the flow ends. In step S7, where a determination has been made in step S4 that sufficient resources are not available in the Cloud, a determination is made whether or not the first Cloud provider already has in place a master agreement with another provider capable of executing the requirement at hand. In step S8, given that a matching master agreement is in place, the job is routed to the partner Cloud for execution. This routed job may be a new job, or may be a current locally executing job (to free up local resources). The job then executes per alternate Cloud norms or specifics from the master agreement. In a preferred embodiment, the "original" Cloud would communicate with the alternate Cloud using standard protocols and would track the job in conjunction with the remote Cloud.

In step S9, given a suitable master agreement is not in place or partner Cloud resources are not currently available, a logic branch takes place and a real-time search for the required resources is conducted. This search could include both internal and external resources, Cloud and non-Cloud resources, or any combination thereof.

In step S10, if suitable external resources are located, available, and desirable, a scheduling request is made to the alternate provider, and upon approval (probably at point in time prevailing rates), those resources are utilized for the job execution. If, on the other hand, resources cannot be located, or are not desirable, a branch is made to step S11, and the job is refused. A variety of existing techniques can then be used to notify and message the end-user.

Figure 5:
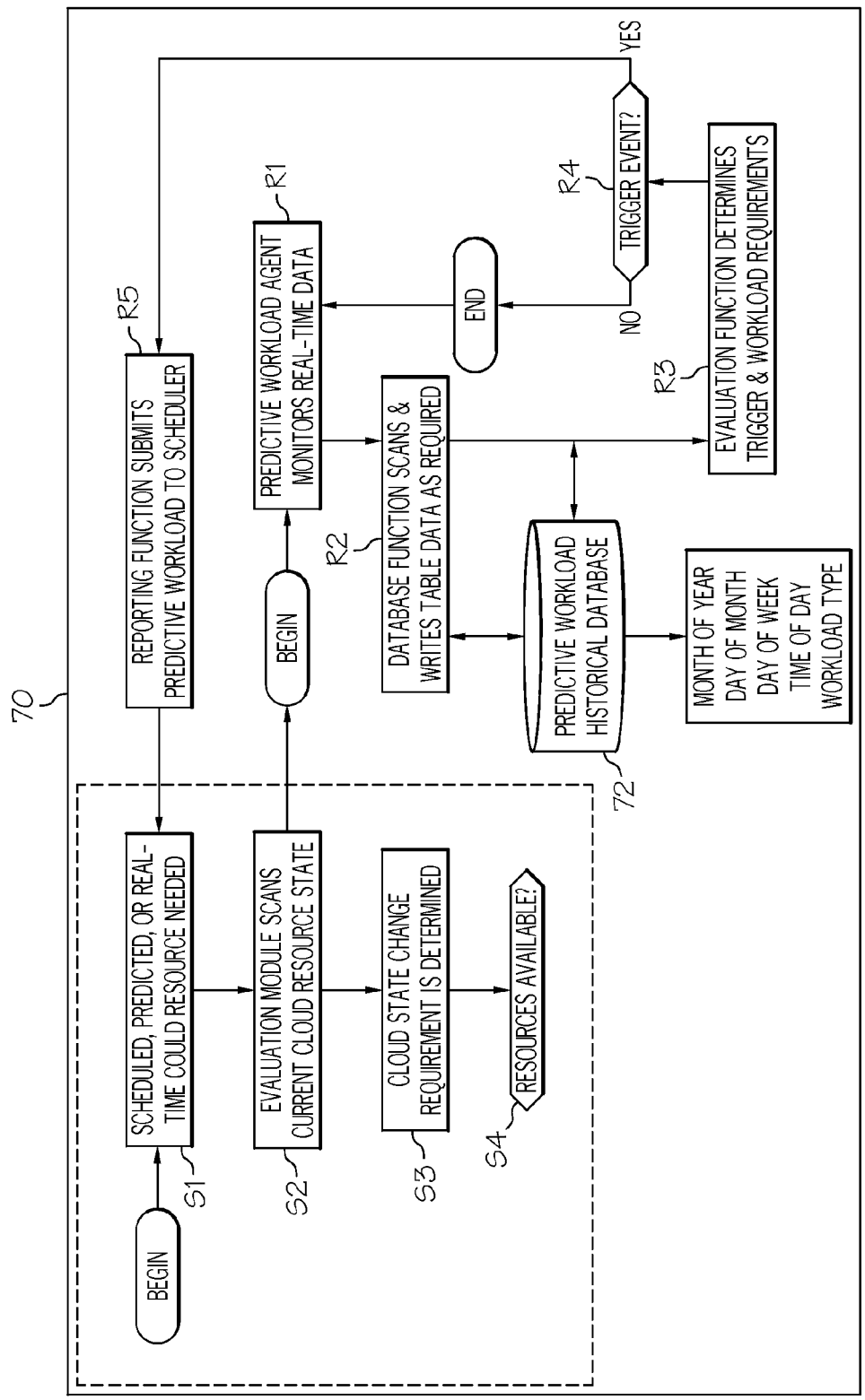
FIG. 5 shows a second method diagram according the present invention.

Referring now to FIG. 5, infrastructure and associated functions/steps that enable step S1 will be described in greater detail. In a preferred embodiment of the present invention, step S1 of FIG. 4 is enabled (at least in part) by a predictive workload subsystem 70 that is comprised of a software agent process running in the background. This agent itself is comprised of a monitor function, a database write and scan function, an evaluation function, a trigger function, and a reporting function. Typically, the agent runs at all times while the Cloud computing environment is operational.

Regardless, in step R1, the monitoring function of the agent provides real-time tracking/monitoring of the current Cloud resource state to include which resources are currently in use and which are not. In step R2, current Cloud resource state data is passed to the database function and is written to the current state table of a predictive workload (e.g., historical) database 72. A scan of the history data is then performed and the current state is categorized for placement in the history table of the database 72. If current state is within a tolerance of an existing historical state, a "match" occurs and a known state is recorded. If current state is not within a tolerance of an existing state, a new state is written to the historical database.

In step R3, based on the determined state and other data passed by step R2, a predictive evaluation occurs with respect to whether unscheduled resources have historically been required while in this state. Example evaluation criteria passed from the database includes present state parameters (current CPU percent 80 to 85% busy, for example, which could be expressed as a symbol representing such a state), and evaluates this against the similar historical state data and current relevant factors such as times, dates, workload types, and so forth, that have resulted in unscheduled resource requirements in the past. As an example, on Monday afternoons when scheduled workload is utilizing more than 80% of CPU capacity, it has been necessary in the past to add 2 CPU's per hour for the next 3 hours. This probability match would result in a predictive trigger. The current state data is now written to the history table of the database, and the results of the evaluation are passed on to step R4.

In step R4, if a predictive probability match occurred in step R3, a trigger event is initiated. In a preferred embodiment, the trigger event is packaged as a standard workload and is submitted using a naming convention identifying the submission source. If no trigger is initiated, the current cycle ends. In step R5, the workload is passed to the reporting function which informs the scheduler that a new workload exists. To the scheduler, this workload appears as any other submission, and, as such, future cycles will consider this as real workload and will track and process as a part of the normal Cloud workflow.

Figure 6:
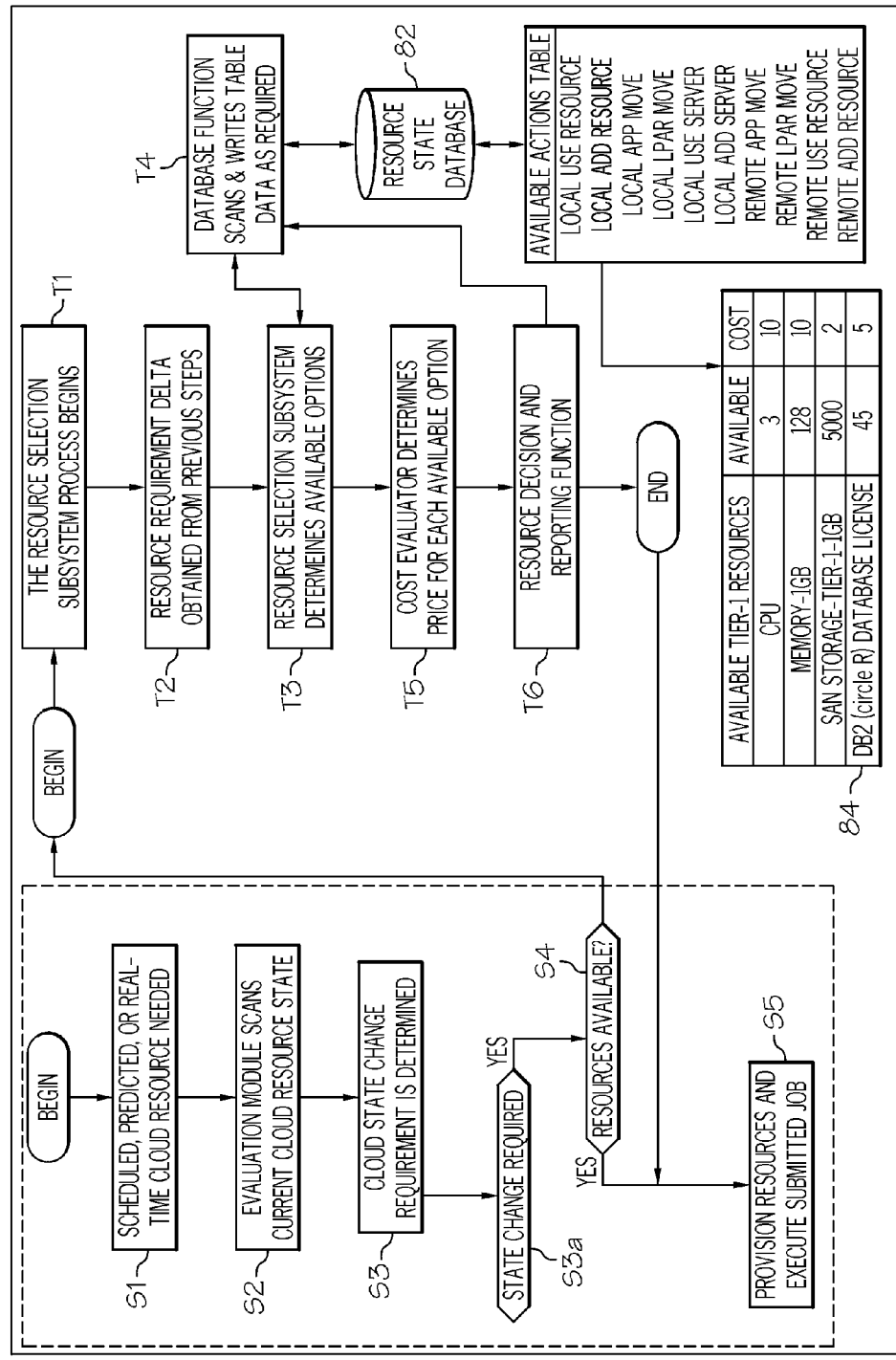
FIG. 6 shows a third method diagram according the present invention.

Referring now to FIG. 6, infrastructure and associated functions/steps that enable steps S3a and S4 will be described in greater detail. In a preferred embodiment of the present invention, these steps are enabled (at least in part) by a resource selection subsystem 80 that is comprised of a software agent process running in the background. This agent itself is comprised of an available resources option evaluation function, a database write and scan function, an available resource cost evaluation function, and a decision and reporting function. This agent runs at all times while the Cloud computing environment is operational.

In step T1, the preceding logic flow has determined that a state change (additional resource) is required. Additionally, at step T2, the resource requirement is understood in terms of the delta of what is currently available and what is needed to satisfy new workload. As an example, if the current Cloud has 6 active and available processors, and the new workload requires eight processors, there is a difference of two processors that must be obtained. In a preferred embodiment, the present invention would include a relational database with a variety of database tables, one of which would contain a complete inventory of Cloud computing resources, current state of said resources, and activation and operational cost of each resource. Additionally, one database table would contain an ordered list of actions with respect to a resource that might be taken in order to obtain required resources. In step T3, the resource selection subsystem 80 would request services from the database scan function as listed in the available actions database table 84. These actions might include, but would not be limited to, the following:

Local use resource—Use local resource that is already active and available.

Local add resource—Activate, make available, then use local resources.

Local app move—Move an application within the Cloud in order to free required resources.

Local LPAR move—Move an environment within the Cloud (OS & all apps) in order to free required resources.

Local use new server—Use an existing active server that is not currently in use.

Local add new server—Power-on, activate, and use a new server that was not currently active.

Remote app move—Move application to a system external to the Cloud.

Remote LPAR move—Move environment to a system external to the Cloud.

Remote use resource—Use a resource that is external to the Cloud.

Remote add resource—Add a resource that is external to the Cloud.

In a preferred embodiment, as depicted in step T4, each action in an available actions table 84 (e.g., stored in available actions database 82) would have a corresponding database table consisting of a list of resources potentially associated with that action. Referring to FIG. 6, the action "Local add resource" is being evaluated, and a list of available, but inactive, resources along with associated costs is provided. Note that the available resource table here is for tier-1 resources. In a preferred embodiment, lower tier applications could use any tier resources equal to or above the required tier, but never lower tier resources. Given the example here, the data set of two CPU's available at a cost of "20" would be returned to the cost evaluator. At this point, the next available action is evaluated, and so on, until all available actions have been evaluated and priced.

In step T5, the cost evaluator receives data and cost (collectively referred to as delivery parameters or criteria) associated with each possible action that may be taken in order to fulfill the request for resources. Such parameters typically include costs, service levels, and delivery timeframes for each action. In a preferred embodiment, the lowest cost option would be selected and resources would be provided to the Cloud using this action. It is possible, however, that other parameters/criteria are considered when evaluating the possible actions, and thus may cause an action other than the low cost option to be selected.

In step T6, the action decision is finalized, and the reporting function informs the provisioning function of the required state changes and associated actions to be taken in order to obtain required resources. Upon successful provisioning and activation of the required resources, the resource database tables are updated with the new current state.

While shown and described herein as a dynamic resource provisioning solution, it is understood that the invention further provides various alternative embodiments. For example, in one embodiment, the invention provides a computer-readable/useable medium that includes computer program code to enable a computer infrastructure to provide dynamic resource provisioning functionality as discussed herein. To this extent, the computer-readable/useable medium includes program code that implements each of the various processes of the invention. It is understood that the terms computer-readable medium or computer-useable medium comprises one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as memory 28 (FIG. 1) and/or storage system 34 (FIG. 1) (e.g., a fixed disk, a read-only memory, a random access memory, a cache memory, etc.), and/or as a data signal (e.g., a propagated signal) traveling over a network (e.g., during a wired/wireless electronic distribution of the program code).

In another embodiment, the invention provides a method that performs the process of the invention on a subscription, advertising, and/or fee basis. That is, a service provider, such as a Solution Integrator, could offer to provide dynamic resource provisioning. In this case, the service provider can create, maintain, support, etc., a computer infrastructure, such as computer system 12 (FIG. 1) that performs the process of the invention for one or more customers. In return, the service provider can receive payment from the customer(s) under a subscription and/or fee agreement and/or the service provider can receive payment from the sale of advertising content to one or more third parties.

In still another embodiment, the invention provides a computer-implemented method for providing dynamic resource provisioning functionality. In this case, a computer infrastructure, such as computer system 12 (FIG. 1), can be provided and one or more systems for performing the process of the invention can be obtained (e.g., created, purchased, used, modified, etc.) and deployed to the computer infrastructure. To this extent, the deployment of a system can comprise one or more of: (1) installing program code on a computing device, such as computer system 12 (FIG. 1), from a computer-readable medium; (2) adding one or more computing devices to the computer infrastructure; and (3) incorporating and/or modifying one or more existing systems of the computer infrastructure to enable the computer infrastructure to perform the process of the invention.

As used herein, it is understood that the terms "program code" and "computer program code" are synonymous and mean any expression, in any language, code, or notation, of a set of instructions intended to cause a computing device having an information processing capability to perform a particular function either directly or after either or both of the following: (a) conversion to another language, code, or notation; and/or (b) reproduction in a different material form. To this extent, program code can be embodied as one or more of: an application/software program, component software/a library of functions, an operating system, a basic device system/driver for a particular computing device, and the like.

A data processing system suitable for storing and/or executing program code can be provided hereunder and can include at least one processor communicatively coupled, directly or indirectly, to memory element(s) through a system bus. The memory elements can include, but are not limited to, local memory employed during actual execution of the program code, bulk storage, and cache memories that provide temporary storage of at least some program code in order to reduce the number of times code must be retrieved from bulk storage during execution. Input/output or device devices (including, but not limited to, keyboards, displays, pointing devices, etc.) can be coupled to the system either directly or through intervening device controllers.

Network adapters also may be coupled to the system to enable the data processing system to become coupled to other data processing systems, remote printers, storage devices, and/or the like, through any combination of intervening private or public networks. Illustrative network adapters include, but are not limited to, modems, cable modems, and Ethernet cards.

The foregoing description of various aspects of the invention has been presented for purposes of illustration and description. It is not intended to be exhaustive or to limit the invention to the precise form disclosed and, obviously, many modifications and variations are possible. Such modifications and variations that may be apparent to a person skilled in the art are intended to be included within the scope of the invention as defined by the accompanying claims.

What is claimed is:

1. A method for dynamically provisioning resources within a Cloud computing environment, comprising:
    monitoring Cloud resource workload states in real time;
    storing the Cloud resource workload states in a predictive workload database as historical data;
    predicting a need for Cloud resources based on a comparison of a current activity state against said stored historical data;
    identifying a need for Cloud resources for a first Cloud provider responsive to the need being predicted;
    evaluating a current activity state of the first Cloud provider to determine if a state change is required to address the need;
    determining whether within the first Cloud provider sufficient resources exist to address the need;
    making a determination as to a set of resource procuring actions to address the need; and
    dynamically provisioning and activating a set of Cloud resources to perform the set of resource procuring actions,
wherein the determination is based upon at least one delivery parameter selected from the group comprising costs, service levels, and delivery time frames.

2. The method of claim 1, further comprising identifying a second Cloud provider to fulfill any inability of the first Cloud provider to provide the set of Cloud resources.

3. The method of claim 2, the identifying comprising searching for a master agreement associated with a second Cloud provider to provide the set of Cloud resources.

4. The method of claim 2, the identifying comprising conducting a real-time search of Cloud providers to identify a second Cloud provider capable of providing the set of Cloud resources.

5. The method of claim 2, the dynamically provisioning comprising dynamically provisioning the set of Cloud resources as provided by the second Cloud provider.

6. The method of claim 1, further comprising:
    scheduling a job to address the need by causing the state change; and
    carrying out the job using the set of resources.

7. A system for dynamically provisioning resources within a Cloud computing environment, comprising:

a memory medium comprising instructions;
a bus coupled to the memory medium;
a processor coupled to the bus that when executing the instructions causes the system to:
  monitor Cloud resource workload states in real time;
  store the Cloud resource workload states in a predictive workload database as historical data;
  predict a need for Cloud resources based on a comparison of a current activity state against said stored historical data;
  identify a need for Cloud resources for a first Cloud provider responsive to the need being predicted;
  evaluate a current activity state of the first Cloud provider to determine if a state change is required to address the need;
  determine whether within the first cloud provider sufficient resources exist to address the need;
  make a determination as to a set of resource procuring actions to address the need; and
  dynamically provision and activate a set of Cloud resources to perform the set of resource procuring actions,
wherein the determination is based upon at least one delivery parameter selected from the group comprising costs, service levels, and delivery time frames.

8. The system of claim 7, the system further being caused to identify a second Cloud provider to fulfill any inability by the first Cloud provider to provide the set of Cloud resources.

9. The system of claim 8, the system further being caused to search for a master agreement associated with a second Cloud provider to provide the set of Cloud resources.

10. The system of claim 8, the system further being caused to conduct a real-time search of Cloud providers to identify a second Cloud provider capable of providing the set of Cloud resources.

11. The system of claim 8, the system further being caused to dynamically provision the set of Cloud resources as provided by the second Cloud provider.

12. The system of claim 7, the system further being caused to:
  schedule a job to address the need; and
  carry out the job using the set of resources.

13. A non-transitory computer readable device containing a program product for dynamically provisioning resources within a Cloud computing environment, the non-transitory computer readable device comprising program code for causing a computer to:
  monitor Cloud resource workload states in real time;
  store the Cloud resource workload states in a predictive workload database as historical data;
  predict a need for Cloud resources based on a comparison of a current activity state against said stored historical data;
  identify a need for Cloud resources for a first Cloud provider responsive to the need being predicted;
  evaluate a current activity state of the first Cloud provider to determine if a state change is required to address the need;
  determine whether within the first cloud provider sufficient resources exist to address the need;
  make a determination as to a set of resource procuring actions to address the need; and
  dynamically provision and activate a set of Cloud resources to perform the set of resource procuring actions,
wherein the determination is based upon at least one delivery parameter selected from the group comprising costs, service levels, and delivery time frames.

14. A method for deploying a system for dynamically provisioning resources within a Cloud computing environment, comprising:
  monitoring, by at least one computing device, Cloud resource workload states in real time;
  storing, by the at least one computing device, the Cloud resource workload states in a predictive workload database as historical data;
  predicting, by the at least one computing device, a need for Cloud resources based on a comparison of a current activity state against said stored historical data;
  identifying, by the at least one computing device, a need for Cloud resources for a first Cloud provider within the cloud computing environment responsive to the need being predicted;
  evaluating, by the at least one computing device, a current activity state of the first Cloud provider to determine if a state change of the cloud computing environment is required to address the need;
  determining, by the at least one computing device, whether within the first cloud provider sufficient resources exist to address the need;
  making, by the at least one computing device, a determination as to a set of resource procuring actions to address the need; and
  dynamically provisioning, by the at least one computing device, to and activate on a set of computer nodes a set of Cloud resources to perform the set of resource procuring actions,
wherein the determination is based upon at least one delivery parameter selected from the group comprising costs, service levels, and delivery time frames.

* * * * *